(12) United States Patent
Stanke et al.

(10) Patent No.: US 12,423,649 B2
(45) Date of Patent: Sep. 23, 2025

(54) SYSTEM AND METHOD FOR DETERMINING AN ON-SHELF AVAILABILITY STATUS OF AN ITEM WITHIN A RETAIL LOCATION

(71) Applicant: Target Brands, Inc., Minneapolis, MN (US)

(72) Inventors: Samantha Jo Stanke, Minneapolis, MN (US); Jake Thomas Linnabary, Maple Grove, MN (US); Andrew Peter Kuledge, Minneapolis, MN (US); Samantha Megan Schumacher, Roseville, MN (US); Swapnil Satish Deshpande, Lakeville, MN (US); Jacqlyn Johnson Poss, St. Louis Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 337 days.

(21) Appl. No.: 18/155,352

(22) Filed: Jan. 17, 2023

(65) Prior Publication Data

US 2024/0242174 A1    Jul. 18, 2024

(51) Int. Cl.
G06Q 10/087 (2023.01)
G06Q 10/0631 (2023.01)

(52) U.S. Cl.
CPC ..... *G06Q 10/087* (2013.01); *G06Q 10/06311* (2013.01)

(58) Field of Classification Search
CPC ............ G06Q 10/087; G06Q 10/06311
See application file for complete search history.

(56) References Cited

U.S. PATENT DOCUMENTS

| | | | |
|---|---|---|---|
| 7,398,232 B2 | 7/2008 | Renz et al. | |
| 8,321,302 B2 | 11/2012 | Bauer et al. | |
| 8,468,066 B2 | 6/2013 | Goldberg et al. | |
| 2007/0061210 A1 | 3/2007 | Chen et al. | |
| 2019/0149725 A1* | 5/2019 | Adato | H04N 1/00 348/158 |

(Continued)

FOREIGN PATENT DOCUMENTS

KR    101966557 B1    4/2019

OTHER PUBLICATIONS

NPL_Casado-Garcia_2020: Ensemble Methods for Object Detection By Angela Casado-Garcia et. al. Available at: https://www.unirioja.es/cu/joheras/papers/ensemble.pdf Publication date: Feb. 9, 2020. (Year: 2020).*

NPL_Mo_2019: Image recognition using convolutional neural network combined with ensemble learning algorithm By: Weilong Mo et al 2019 J. Phys.: Conf. Ser. 1237 022026. Available at: https://iopscience.iop.org/article/10.1088/1742-6596/1237/2/022026/pdf (Year: 2019).*

(Continued)

*Primary Examiner* — Florian M Zeender
*Assistant Examiner* — Kimberly S. Bursum
(74) *Attorney, Agent, or Firm* — Merchant & Gould P.C.

(57) ABSTRACT

A process for determining an on-shelf availability status of an item within a retail location is provided. In example aspects, a plurality of potential unavailability events associated with an item for sale at the retail location are received from a collection of product availability detection systems. Potential unavailability events are aggregated in an ensemble model to calculate an overall unavailability score for the item. Based on the overall unavailability score, different actions may be taken, such as updating a tracked inventory or generating a restocking assessment notification.

20 Claims, 8 Drawing Sheets

(56) References Cited

U.S. PATENT DOCUMENTS

| | | | |
|---|---|---|---|
| 2019/0215424 A1* | 7/2019 | Adato | G07G 1/0036 |
| 2019/0236531 A1* | 8/2019 | Adato | G08B 21/182 |
| 2021/0192435 A1 | 6/2021 | Fernandes et al. | |
| 2021/0374836 A1* | 12/2021 | Bronicki | H04N 7/181 |
| 2021/0398202 A1* | 12/2021 | Adato | G06Q 10/06313 |
| 2021/0400195 A1* | 12/2021 | Adato | G06Q 30/0201 |
| 2022/0027927 A1 | 1/2022 | Nazarian et al. | |
| 2022/0122489 A1* | 4/2022 | Adato | G06V 40/10 |
| 2022/0122493 A1* | 4/2022 | Adato | G06V 40/10 |
| 2022/0277263 A1 | 9/2022 | Esmalifalak et al. | |
| 2022/0374970 A1* | 11/2022 | Bronicki | G06Q 30/0241 |
| 2023/0004174 A1* | 1/2023 | Burghardt | G05D 1/102 |
| 2023/0067026 A1* | 3/2023 | Huts | G06V 20/00 |
| 2023/0177458 A1* | 6/2023 | Kim | G06V 10/82 705/28 |
| 2023/0206206 A1* | 6/2023 | Santi | G06Q 20/208 705/23 |
| 2025/0124402 A1* | 4/2025 | Agarwal | G06Q 30/0631 |

OTHER PUBLICATIONS

NPL_Rosado_2016: Supervised learning for Out-of-Stock detection in panoramas of retail shelves, By L. Rosado, J. Gonçalves, J. Costa, D. Ribeiro and F. Soares, 2016 IEEE International Conference on Imaging Systems and Techniques (IST), Chania, Greece, 2016, pp. 406-411,https://ieeexplore.ieee.org/abst (Year: 2016).*

NPL_Papakiriakopoulos_2012 Predict on-shelf product availability in grocery retailing with classification methods Expert Systems with Applications, By Demitris Papakiriakopoulos, vol. 39, Issue 4, 2012, pp. 4473-4482 https://www.sciencedirect.com/science/article/pii/80957417411014643 (Year: 2012).*

NPL_Sikic_2024: Enhanced Out-of-Stock Detection in Retail Shelf Images Based on Deep Learning by Franko Šikić, Zoran Kalafatić, Marko Subašić and Sven Lončarić Sensors 2024, 24, 693, Available at: https://www.mdpi.com/1424-8220/24/2/693 (Year: 2024).*

* cited by examiner

SYSTEM AND METHOD FOR DETERMINING AN ON-SHELF AVAILABILITY STATUS OF AN ITEM WITHIN A RETAIL LOCATION

BACKGROUND

It is important for retail enterprises (including, typically, a chain of retail locations) to know with accuracy whether any of the items carried at a given retail location is available on shelf at that location. When an item is not present on the shelf at the retail location, the retail enterprise may not only lose any potential sales on that item, but the retail enterprise may also lose additional sales as customer satisfaction drops and customers switch to alternative retailers.

Maintaining accuracy of product availability at a given retail location for each item carried at that location is an ongoing problem because inventory management systems may become incorrect for a number of reasons. For example, a shopper may check out with a number of different variants of the same item (e.g., flavors of yogurt) and a cashier may scan only one of those items and submit a quantity, rather than scanning each individual, different variant independently. This could lead to one variant of the item having an inaccurately low stated inventory while the other variants have an inaccurately high stated inventory. The accuracy of an inventory management system may be impacted by the way in which items are stocked on the shelves. For example, batteries may be stocked in multiple locations within a single retail store for shopping convenience; it may be difficult to determine, absent visual inspection, whether any one location within the retail location is out of stock, or whether all locations are out of stock, since retailers may only track the "on hand" amount, rather than the amount at a given location (e.g., at a department or on a particular assigned shelf) within the retail location. In a further example where product availability may become unclear, an item may be moved from a stockroom at a retail store out onto a shelf, but that movement may not be captured by an inventory management system, so the stated inventory in the inventory management system would be lower than the actual inventory on the shelf. Additionally, movement of an item from one shelf to another, potentially by customers who initially intend to purchase the item but later change their mind and leave the item on the closest shelf, could also lead an inventory management system to state that the item is in stock when the shelf on which the item is supposed to be sold is empty (e.g., based on automated stock detection systems, or based on customer or employee reporting of empty shelves). Finally, theft may cause changes that are not automatically subtracted from a stated inventory.

SUMMARY

In general, the present disclosure relates to a system and method for determining an on-shelf availability status of an item within a retail location. In example embodiments, an ensemble model is used to aggregate signals from a plurality of product availability detection systems to calculate an overall unavailability score for an item.

In a first aspect, a method of determining an on-shelf availability status of an item within a retail location is provided. A plurality of product availability detection systems monitors the availability of a collection of items offered for sale at the retail location. The product availability detection systems are configured to generate a potential unavailability event in response to detecting that at least one item in the collection of items is unavailable. A collection of potential unavailability events associated with an item in the collection of items is received from the product availability detections systems, and each potential unavailability event is classified as either a strong signal or a weak signal. The classification as a strong or weak signal is based, at least in part, on the product availability detection system from which the potential unavailability event is received. If each potential unavailability event is classified as a weak signal, then an overall unavailable score is determined at an ensemble model. Based on a determination that at least one of the potential unavailability events is classified as a strong signal or that the overall unavailability score exceeds a predetermined threshold, a restocking assessment notification is generated.

In a second aspect, an inventory management system for a retail location is provided. The inventory management system includes a plurality of product availability detection systems and a shelf availability assessment system, the shelf availability assessment system including an ensemble model and executing on a computer system. The plurality of product availability detection systems is configured to output a potential unavailability event in response to detection of product unavailability of at least one item in a plurality of items. The potential unavailability event includes a probability of unavailability for the at least one item and an accuracy of the product availability detection system determined from a training accuracy of the product availability detection system. The shelf availability assessment system receives a collection of potential unavailability events from the plurality of different product availability detection systems, the collection of potential unavailability events each being associated with an item from the plurality of items. The shelf availability assessment system classifies each of the potential unavailability events as a strong signal or a weak signal. This classification is based, at least in part, on the product availability detection system from which the potential unavailability event is received. If each potential unavailability event is classified as a weak signal, then an overall unavailable score is determined at the ensemble model. Based on a determination that at least one of the potential unavailability events is classified as a strong signal or that the overall unavailability score exceeds a predetermined threshold, a restocking assessment notification is generated by the shelf availability assessment system.

In a third aspect, a shelf availability assessment system for use at a retail location is provided. The shelf availability system comprises a signal collector, an ensemble model, and a signal output. The signal collector receives a collection of potential unavailability events from a plurality of product availability detection systems, the collection of potential unavailability events each being associated with an item from a collection of items for sale at the retail location. The signal collector also converts potential unavailability events to a probabilistic state. The ensemble model can receive a plurality of potential unavailability events from the signal collector and calculate an overall unavailability score in an ensemble method. The overall unavailability score is based, at least in part, on probabilities associated with the plurality of potential unavailability events. The signal output receives the overall unavailability score from the ensemble model. The signal output also generates an unavailability response based, at least in part, on the overall unavailability score.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
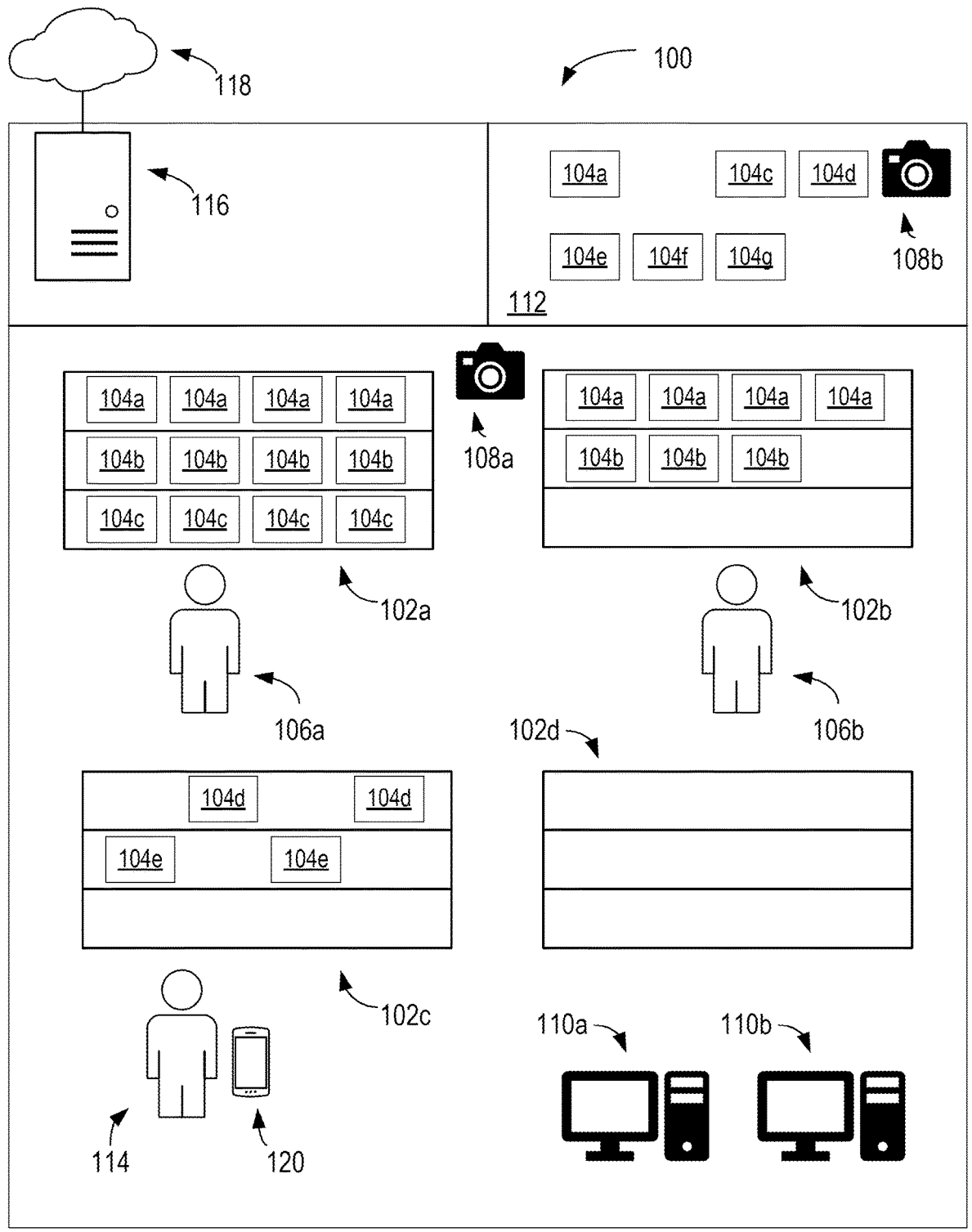
FIG. 1 illustrates a retail location at which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used herein, the term "including" as used herein should be read to mean "including, without limitation," "including but not limited to," or the like.

As briefly described above, embodiments of the present invention are directed to a system and method for determining an on-shelf availability status of an item within a retail location. In example aspects, an ensemble model is used to aggregate signals from a plurality of product availability detection methods to calculate overall unavailability scores for items for sale at the retail location. In example aspects, detection systems from among a plurality of product availability detection systems provide information indicative of a current inventory of items on shelves at the retail location. Some such detection systems may also output a probability of unavailability for the items that it monitors, and, in some instances, may also output an associated accuracy of that predicted unavailability. This accuracy is used by the ensemble model to weigh the probabilities output by the detection methods. Additional detection systems may include discrete, event-based information that can be used to further inform an overall unavailability score. An overall unavailability score may be generated via the ensemble model; that overall unavailability score is informed by the individual probabilities and accuracies of underlying detection systems, and may further be informed using discrete-value availability signals.

In a particular example implementation, retail enterprises may track inventory at each retail location using, on a per-item basis, sales numbers derived from point-of-sale devices, supply chain-based algorithms, guest feedback, or cameras that scan shelves for the presence (or absence) of particular items. Such retail enterprises may also track events occurring at a retail location, such as a loss prevention event (e.g., a stolen item) or damage to items. Various item tracking systems may be used to track different items at a common retail location, and which may provide information regarding inventory unavailability.

In a further example aspect, while the ensemble model is used to calculate the probability of unavailability for the items in the retail store, an accuracy assessment is calculated. The accuracy assessment is calculated by analyzing ledgers of transaction and item audits from the retail location. This accuracy assessment is used with the overall unavailability score calculated by the ensemble model to predict whether an item is out of stock in the retail location.

By utilizing an ensemble model, better predictions of whether an item is out of stock can be made than by using individual detection systems. While individual detection systems may have items for which they perform well, the wide variety of items sold at a retail location make it difficult for an individual detection system to provide perfect coverage. For example, a detection system may be well suited for detecting out of stocks for fast-moving items, such as cleaning products or office supplies, but may struggle at predicting out of stocks for slow-moving items, such as electronics. By aggregating outputs from many detection systems in an ensemble model, the strengths of each individual detection system can be utilized to provide a more accurate prediction across all items at the retail location than an individual detection system can provide on its own.

Further, the use of an ensemble model improves extensibility to allow the detection systems to be updated over time. As new detection systems are implemented, the new systems can easily be worked into the ensemble model with minimal changes to the process as a whole. Additionally, out-of-date detection systems can be removed from the ensemble model as they become less valuable to the availability calculation.

Turning now to FIG. 1, a retail location at which aspects of the present disclosure may be implemented is shown. The retail location 100 has a plurality of shelves 102 on which items for sale 104 are stocked. Customers 106 may walk around the retail location 100 shopping for items 104. A camera system 108 may monitor the customers 106 as they walk around the retail location 100 to prevent theft, or to monitor shelf locations for a stocking status of particular items. Items 104 may be purchased by customers 106 at point-of-sale (POS) systems 110 within the retail location 100. The retail location may also include a storeroom 112 in which additional items 104 may be stored until they are used by retail location employees 114 to restock the shelves 102.

The availability of items 104 in the retail location 100 may vary by item 104, and by shelf 102. Shelves 102 may be completely stocked of items 104. As customers 106 purchase items 104, shelves 102 may become less stocked. Some shelves 102 may even be completely empty. Items 104 may be sold on multiple shelves 102, and these shelves may have varying inventory levels. For example, a first shelf 102a may be fully stocked with three types of items 104a-c, but a second shelf 102b may have fewer items 104a-c or none at all. Some of the items 104 may have additional inventory in the storeroom 112 that may be used to restock the shelves 102 as the items 104 are sold. Other items 104 may not have additional inventory in the storeroom 112. There may also be items 104 that are not stocked on any shelf 102 but are available in the storeroom 112.

The retail location 100 may include a computer system 116 for connecting various systems at the retail location 100, including the POS systems 110 and the camera system 108. The computer system 108 may also be connected to a wide area network 118 for communicating with systems external to the retail location 100, such as a retail enterprise.

The computer system 116 may be used to track inventories of the items 104 at the retail location 100. Item inventories may be tracked for an overall amount of the item 104 on hand at the retail location 100, which may also be split to track inventories for an amount of the item 104 displayed on the shelves 102 and an amount of the item 104 stored in the storeroom 112. Information from the other systems at the retail location 100 can be used by the computer system 116 in its inventory tracking, such as images of shelves 102 from the camera system 108 and sales data from the POS systems 110. More details regarding the tracking of inventories at a retail location 110 are provided below.

The computer system 116 may use the tracked inventories to alert retail location employees 114 when shelves 102 need to be restocked. In an embodiment, a notification is sent to the employee 114 via a mobile device 120. Upon receipt of the notification, the employee 114 can take appropriate actions to restock items 104 on the shelves 102. Other notifications may be sent from the computer system 116 to the employee 114 via the mobile device 120 as well. In alternative embodiments, inventories may be tracked by other components, instead of or in addition to the computer system 116, and in those embodiments, the employee 114 may receive restocking assessment notifications from components other than the computer system 116.

Figure 2:
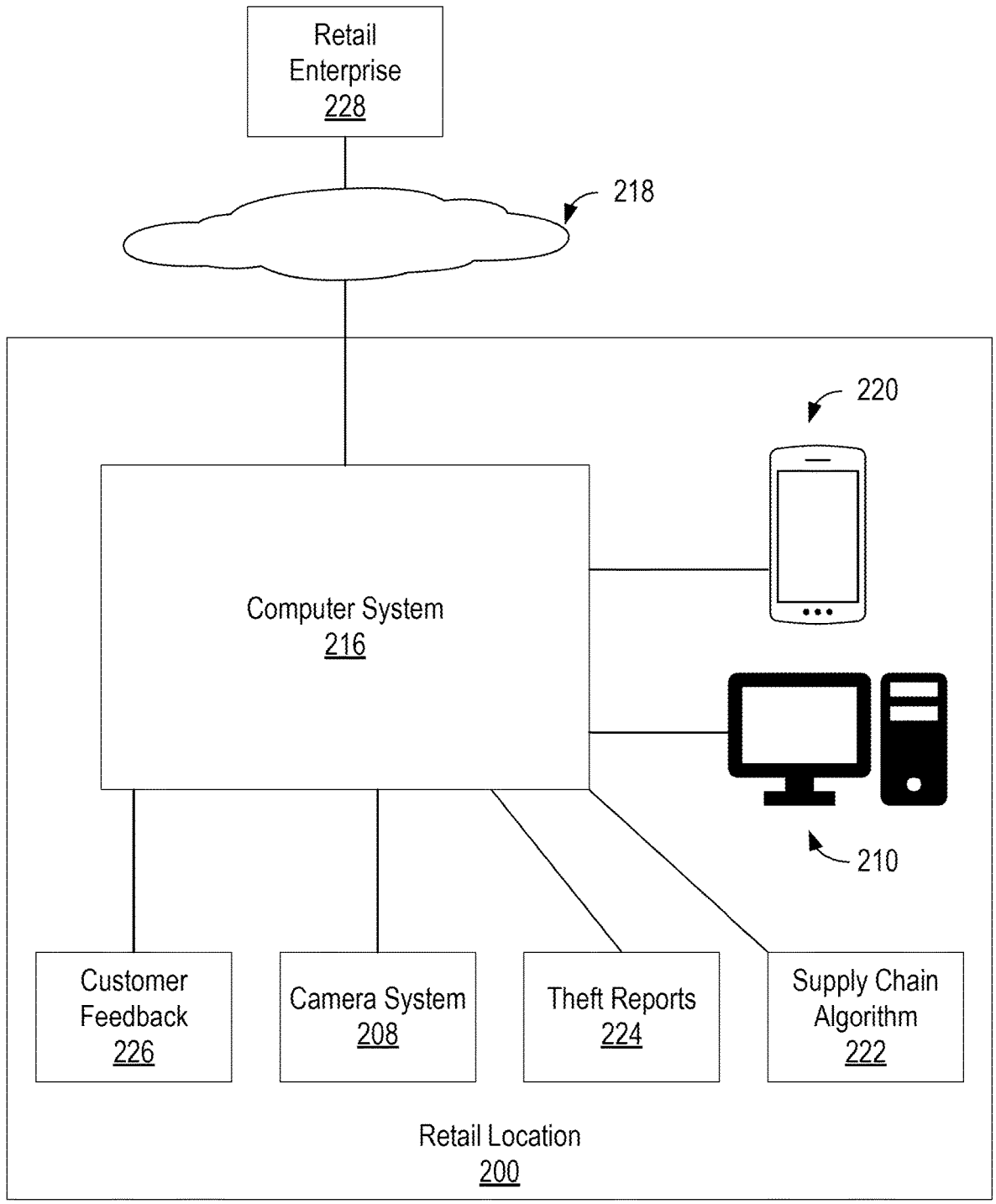
FIG. 2 illustrates a plurality of product availability detection systems operating within a retail location.

Referring to FIG. 2, a plurality of product availability detection systems operating within a retail location is shown. The plurality of product availability detection systems may be used in the retail location 200 to monitor the availability of items for sale. The detection systems may track items both on shelves and in a storeroom.

In an embodiment, a camera system 208 may be used to record images of the shelves and use computer vision algorithms to assess the number of items on the shelves. Example camera systems and algorithms are described in U.S. patent application Ser. No. 17/681,507, filed on Feb. 25, 2022, and U.S. patent application Ser. No. 17/681,491, filed on Feb. 25, 2022, the disclosures of each of which are hereby incorporated by reference in their entireties.

In addition, a supply chain-based algorithm 222 may also be used to manage inventory, using historical data on how long it has taken for items to be received at the retail location 200 after they are ordered to make inventory calculations and predictions. Additionally, sales data at a POS system 210 may be used to track inventory in the retail location 200. As items are sold at the POS system 210, the tracked inventories for those items at the location are reduced by the number of those items sold. Further, theft reports 224 may be incorporated into inventory counts to reduce the tracked inventory of an item when it is discovered that one of the items was stolen. These theft reports 224 may come from within the retail location 200, or they may be received from a retail enterprise 228 via a wide area network 218. Finally, a customer feedback system 226 may be used to determine item availability. In an embodiment, customers may be able to report when an item is unavailable at a retail location 200 via an application installed on a mobile device. In alternative embodiments, customers may report unavailable items to a retail location employee, who may use a mobile device 220 to report the unavailable item. In further embodiments, the customer feedback system may monitor social media platforms for posts by customers indicating that an item may be unavailable, such as a complaint or a photo or video that shows an empty shelf. Calculations may also be received from the retail enterprise 228 via the wide area network 218. In alternative embodiments, additional or alternative product availability detection systems may be used.

Each detection system in the plurality of detection systems may be connected to a computer system 218 at the retail location 200. The detection systems may be connected to the computer system 216 via a wireless network, such as a local area network. In alternative embodiments, different connection methods may be used. In an embodiment, some detection systems-such as the supply chain-based algorithm 222—may operate on the computer system 216. In alternative embodiments, some detection systems may operate on systems external to the retail location-such as at the retail enterprise 228—and communicate with the computer system 216 via a wide area network 218. The computer system 216 may aggregate output signals from the plurality of detection systems to use in further item availability calculations and to track inventory at the retail location 200. In alternative embodiments, the aggregated outputs may be transmitted from the computer system 216 to another system for further item availability calculations and inventory tracking. These output signals may be potential unavailability events, which the detection systems generate in response to a determination that an item is potentially unavailable.

In example implementations, the potential unavailability events may be in a binary state, a probabilistic state, or a discrete state. In a binary state, the potential unavailability event may include a binary output of the item being either available or unavailable. In a probabilistic state, the potential unavailability event may include a probability that the item is unavailable. In a discrete state, the potential unavailability event may include a discrete value, such as an inventory of the item.

In example implementations, the potential unavailability event may also include an accuracy of the detection system, and a timestamp at which the potential unavailability event was generated. The detection system's accuracy may be determined using training data, or it may be determined using historical data. Further, the detection system's accuracy may be the detection system's accuracy specific to the item, or it may be an average accuracy for the detection system for all items it tracks.

Figure 3:
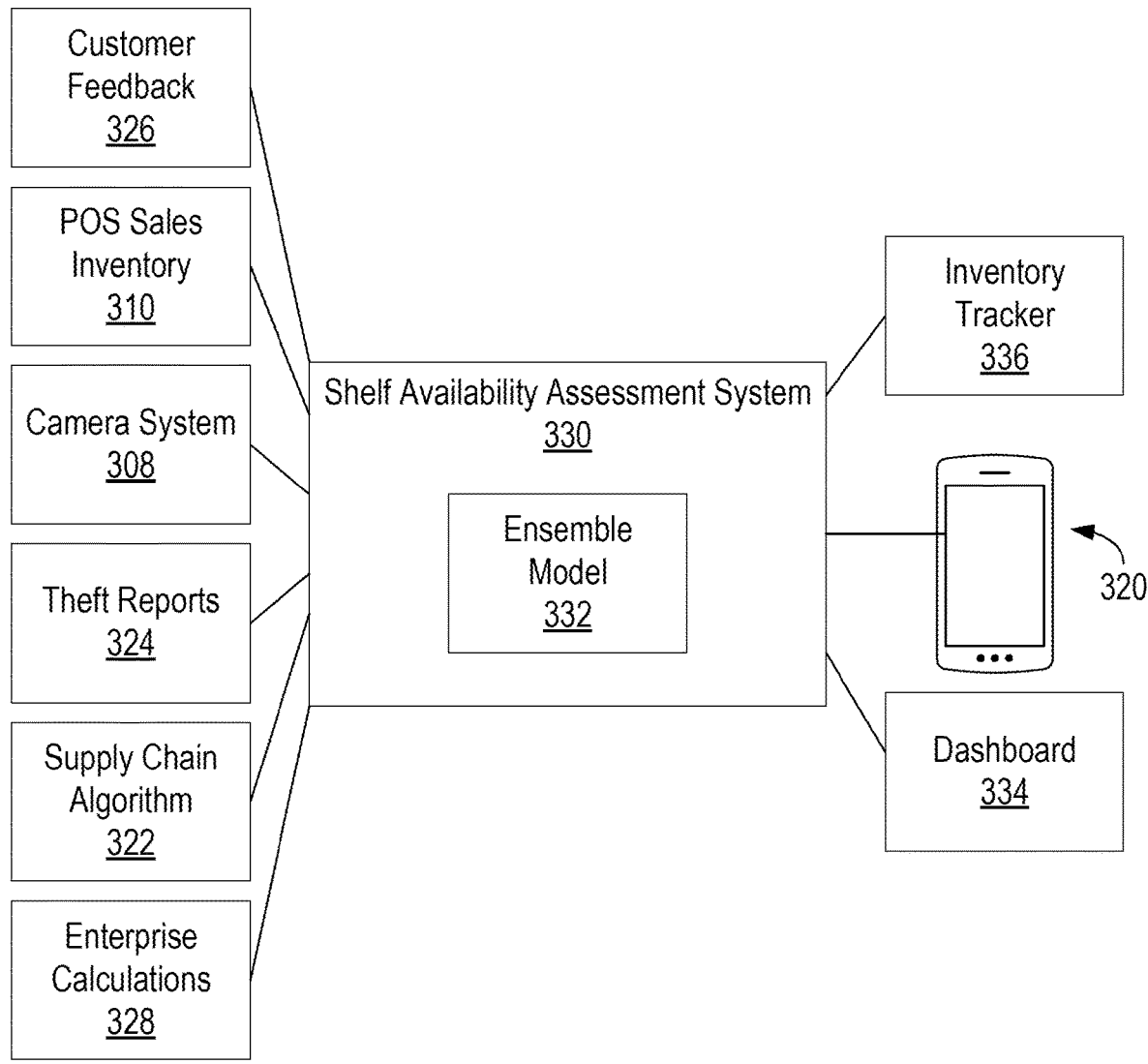
FIG. 3 illustrates a block diagram of a system for determining on-shelf availability of items at a retail location.

FIG. 3 illustrates a shelf availability assessment system for calculating an overall unavailability score for an item in a retail location using outputs from a plurality of product availability detection systems. In an embodiment, the shelf availability assessment system 330 may operate on the computer system 216 described above with relation to FIG. 2. In alternative embodiments, the shelf availability assessment system 330 may operate on alternative computing devices.

The outputs come from a plurality of product availability detection systems. In an embodiment, the detection systems may include a customer feedback system 326, POS system sales inventories 310, a camera system 308, theft reports 324, and a supply chain-based algorithm 322. These detection systems have similar functionalities as the detection systems described above with relation to FIG. 2. The detection systems may further include other calculations by the retail enterprise 328 that predict product availability. These enterprise calculations 328 may use data from other detection systems. For example, an enterprise calculation 328 may use sales data, replenishment data, and inventory system data to generate a probabilistic prediction that an item is unavailable. In alternative embodiments, additional or alternative detection systems may be used. As described above, the outputs from the detection systems may be potential unavailability events, which may be in a binary, probabilistic, or discrete state. The potential unavailability event may also include an accuracy score for the system, and a timestamp of when the potential unavailability event was generated.

When the shelf availability assessment system 330 receives the output signals from the detection systems, it may input the signals into an ensemble model 332. In an embodiment, all of the received outputs are input into the ensemble model 332. In alternative embodiments, only a subset of the received outputs is input into the ensemble model 332. Using the detection system signals, the ensemble model 332 calculates an overall unavailability score for the item. In an embodiment, the overall unavailability score is a probability that the item is unavailable on a shelf at the retail location. The ensemble model 332 may use a cross-validation accuracy weighted probabilistic ensemble (CAWPE). Using CAWPE, a plurality of probability estimates is used to make the ensemble prediction. In an embodiment, the probability estimates are unavailability scores derived from probabilities of unavailability in each potential unavailability event. Each probability estimate in the plurality of probability estimates is weighted with an accuracy for the detection system from which it is derived to calculate a normalized aggregate score. The weight used in the CAWPE calculation is variable and may be set at different values to affect how heavily the inputs with the highest training accuracies impact the final calculation. The weight may be updated as the shelf availability assessment system runs to produce more accurate results. For example, if an overall unavailability score is calculated for an item that indicates that the item is unavailable, but a visual audit for the item indicates that the item is actually available, the weight may be updated so that future calculations are more likely to produce an accurate result. In alternative embodiments, alternative ensemble methods may be used, including majority vote or proportional vote.

The shelf availability assessment system 330 may take a number of actions based on the calculated overall unavailability score. If the overall unavailability score for an item is high enough—for example, above 70%—the shelf availability assessment system 330 may provide notifications to retail location employees working at the retail location via a mobile device 320 informing them that an item needs to be restocked. The notification may also go to a dashboard graphical user interface 334 where employees can see all notifications from the system. The shelf availability assessment system 330 may also update a tracked inventory of an item on an inventory tracker 336, setting the tracked inventory to zero to signify that the item is out of stock. A separate threshold may be set for determining when to automatically update the tracked inventory for an item which may require a higher overall unavailability score than is needed to provide notifications to retail location employees. In an embodiment, the inventory tracker 336 may be displayed on a dashboard graphical user interface 334 that employees can reference to see inventory levels. If the overall unavailability score for an item is moderate—for example, between 30% and 70%—the shelf availability assessment system 330 may provide notifications to retail location employees working at the retail location via a mobile device 320 asking them to visually inspect a shelf to confirm the inventory of the item on that shelf and update the tracked inventory if it does not match the inventory on the shelf. If the overall unavailability score for an item is low—for example, below 40%—the shelf availability assessment system 330 may take no action. By using the overall unavailability score, instances in which items are unavailable on a shelf are reduced. Additionally, less work is required of employees to constantly walk around the retail location inspecting shelves because tracked inventories can be automatically updated when the overall unavailability score is high enough, and instances in which a visual inspection is requested can be limited to situations in which the overall unavailability score is moderate.

The shelf availability assessment system 330 may perform the above functions in realtime, calculating new overall availability scores and generating restocking notifications as the detection systems create potential unavailability events. In alternative embodiments, the shelf availability assessment system 330 performs the above functions on a daily basis, accumulating potential unavailability events over the course of the day. In further embodiments, the shelf availability assessment system 330 may run at other intervals.

It is noted that the various signals received by the shelf availability assessment system 330 may be updated at differing intervals by the various systems from which those signals are received. For example, POS sales inventory systems 310 may provide updates in realtime, while enterprise calculations 328 may be performed periodically (e.g., daily, hourly, or on some other basis). Other systems may operate using different periodic or sporadic time updates. Accordingly, the shelf availability assessment system 330 may be adaptable to operate at different timings based on the observed frequency or extent of updated data received.

Figure 4:
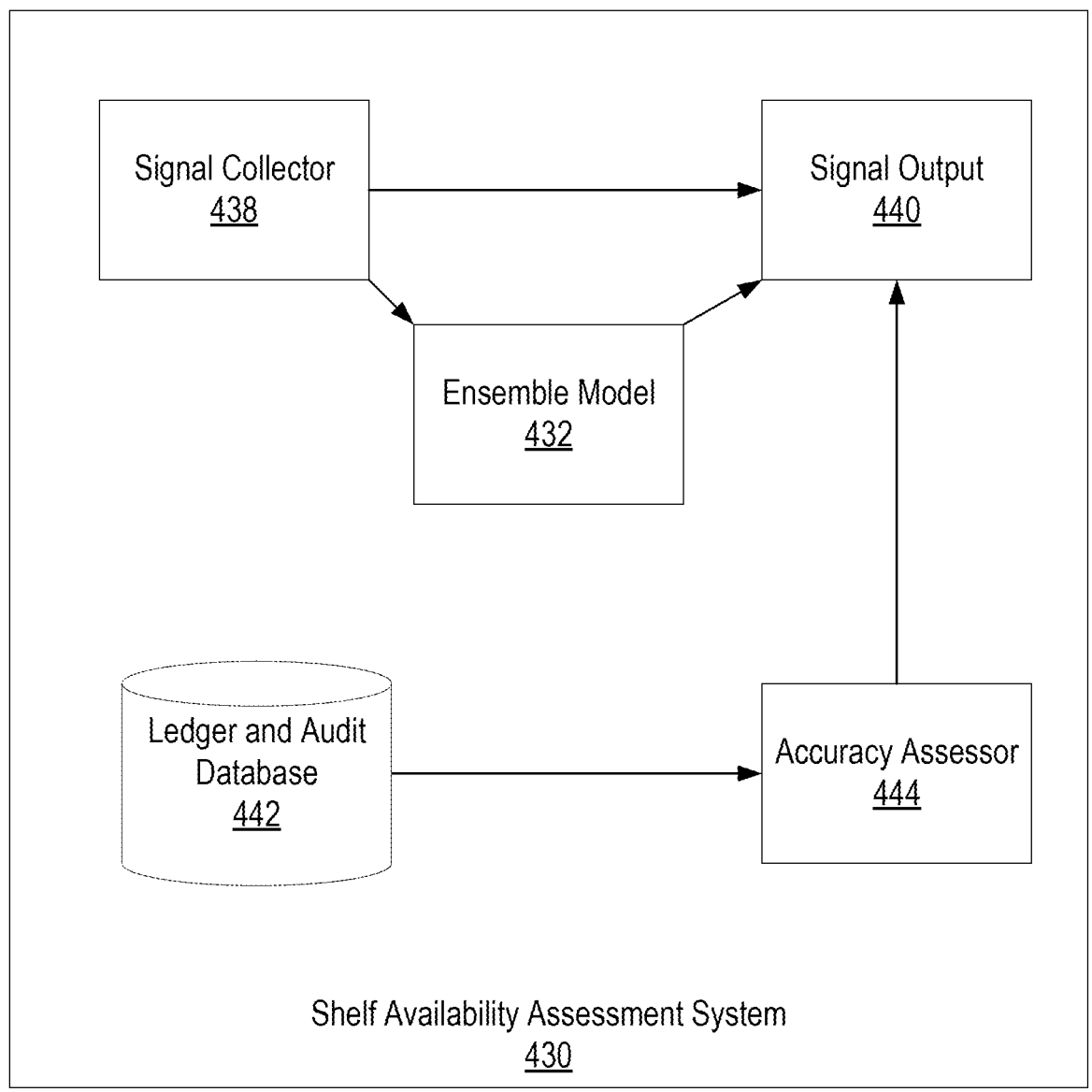
FIG. 4 illustrates a block diagram of a shelf availability assessment system used in determining on-shelf availability of items at a retail location.

Referring to FIG. 4, an example embodiment of a shelf availability assessment system 430 is shown. The shelf availability assessment system 430 may be an example implementation of shelf availability assessment system 330 of FIG. 3. In the illustrated embodiment, the shelf availability assessment system 430 comprises a signal collector 438, a signal output 440, and an ensemble model 432, which are used in calculating an overall unavailability score for an item using signals from a plurality of product availability detection systems. The shelf availability assessment system 430 may also include a database of ledgers and audits 442 and an accuracy assessor 444, which are used to calculate an accuracy assessment for the system. In alternative embodiments additional or alternative components may be included.

The shelf availability assessment system 430 uses signals from a plurality of product availability detection systems. These detection systems may include the detection systems described above. In alternative embodiments, additional or alternative detection systems may be used. The signals received may be potential unavailability events, as described above. The shelf availability assessment system 430 receives these signals at the signal collector 438. In an embodiment, the signal collector 438 includes a network interface, allowing the signal collector 438 to receive signals over a network. The signal collector 438 may be configurable, allowing it to be adapted to receive signals from different detection systems over time. By making the signal collector 438 configurable, the detection systems used by the shelf availability assessment system 430 can be changed over time, allowing new, more accurate detection systems to be added to the system while older, less accurate detection systems can be removed from the system, improving the overall performance of the shelf availability assessment system 430.

Once the signal collector 438 receives the signals, it may perform classification of the signals to determine how the signals are used. In an embodiment, the signal collector 438 may classify the signals as either strong or weak. The determination of whether a signal is strong or weak may be determined by the source of the signal, and/or the historical accuracy of the source. For example, signals received from an enterprise calculation may be treated as a strong signal because the enterprise calculation has a high historical accuracy for its unavailability calculation, whereas signals received from theft reports may be treated as a weak signal because it has a low historical accuracy for its unavailability calculation. A threshold accuracy may be used to determine how high a historical accuracy for a source must be for a signal from that source to be classified as a strong signal. Probabilistic signals may be classified as strong or weak based on whether the probability of unavailability from the signal is above or below a predetermined threshold. For example, the threshold may be set at 70%, so if a signal indicates that there is a 75% chance that an item is unavailable, that signal could be classified as strong, whereas a signal that indicates that there is a 30% chance that an item is unavailable might be classified as weak. Additional classification methods may be used to determine whether a received signal is strong or weak, and additional or alternative classes or thresholds may be used.

Once the received signals are classified, the shelf availability assessment system 430 may use the signals differently depending on their classification. For example, because confidence in the accuracy of strong signals may be high, the strong signals may be sent directly to the signal output 440 rather than being used in the ensemble model 432. A weak signals may be sent to the ensemble model 432 where they are used to calculate an overall unavailability score that is more accurate than the individual weak signals. In alternative embodiments, the strong signals are both passed through to the signal output 440 and included in the signals sent to the ensemble model 432, for example to provide cross-validation of both strong and weak signals. In further embodiments, the ensemble model 432 is only used if all signals are determined to be weak; if any signals are classified as strong, those signals are sent to the signal output 440, and the weak signals are unused. By classifying signals as strong or weak, the shelf availability assessment system 430 can be more efficient, quickly making decision based on a strong signal rather than waiting on an ensemble model 432 calculation. Additionally, it allows weak signals to still be useful through the ensemble model 432 rather than just ignoring them.

The signal collector 438 may also perform operations on the received signals to prepare them for use by the ensemble model 432. In alternative embodiments, these operations may be performed by the ensemble model 432 after receiving the signals, or a different component may perform the operations. Depending on the ensemble method used by the ensemble model 432, the signals may be either probabilistic, binary, or discrete. For example, inputs to a CAWPE model would be probabilistic, whereas inputs to a majority voting model would generally be binary. The signal collector 438 may convert the signals between probabilistic, binary, and discrete states so that the signals can be properly used in the ensemble model 432. For example, a probabilistic signal may be converted into a binary signal by treating probabilities of unavailability above a threshold (e.g., 50%) as unavailable and probabilities of unavailability below that threshold as available. A binary signal may be converted into a probabilistic signal by treating a signal of unavailable as 100% probability of unavailability and a signal of available of 0% probability of availability. Binary signals may also be converted to probabilistic signals by using the accuracy of the source of the signal. For example, if a detection system has an accuracy of 75%, a binary signal of unavailable may be converted to a 75% probability of unavailability, and a signal of available would be converted to a 25% probability of unavailability. Binary signals may be converted to discrete signals by treating an unavailable item as having an inventory of zero and available items as having an inventory of one. Discrete signals may be converted to binary signals by treating an inventory greater than zero as available and inventories of zero as unavailable. A probabilistic signal may be converted to a discrete signal by treating probabilities of unavailability above a threshold (e.g., 50%) as having an inventory of zero and probabilities of unavailability below that threshold as having an inventory of one. Discrete signals may be converted to a probabilistic signal in a scaled manner, with higher inventories in the discrete signal being converted to lower probabilities in the probabilistic signal. For example, a discrete signal with an inventory of five may equate to a probability of unavailability of 2%, while an inventory of one may equate to a probability of unavailability of 35%. The conversions may differ between items based on item characteristics, such as whether the item is a fast-moving item or a slow-moving item. Additionally, signals may be combined to create a signal in the desired state for the ensemble model 432. For example, the signal collector 438 may receive a discrete signal that an item has an inventory of one and a discrete signal that one of that item was stolen. These two discrete signals may be combined to create a binary signal that the item is unavailable.

The signal collector 438 sends signals to the ensemble model 432 where an overall unavailability score is calculated. As described above, the signals are combined using an ensemble method to generate the overall unavailability score for the item. This overall unavailability score is then sent from the ensemble model 432 to the signal output 440.

The signal output 440 may perform different actions based on the overall unavailability score, as described above. The signal output 440 may update a tracked inventory or generate a restocking notification for employees, or it may do nothing if the overall unavailability score is below a predetermined threshold. The signal output 440 may also take these actions when a strong signal is received from the signal collector 438. In an embodiment, the signal output 440 includes a network interface, allowing the notifications and updates to be sent over a network. The network interface may be the same network interface used by the signal collector 438.

The signal output 440 may also resolve situations with overlapping or conflicting signals. Because strong signals may be passed through directly to the signal output 440 without going through the ensemble model 432, the signal output 440 may receive multiple strong signals or it may receive the overall unavailability score and at least one strong signal. When receiving overlapping or conflicting signals, the signal output 440 may perform signal resolution to determine what signal on which to base its output. In an embodiment, the signal output 440 may follow a hierarchy to determine which signal gets priority. For example, the overall unavailability score may have the highest priority and may always be used above individual strong signals.

The priority of strong signals may be determined by a probability of unavailability in the signal-if the signals are probabilistic- or may be determined by a historical accuracy of the detection systems from which the signals originated. In alternative embodiments, the signal with the most recent timestamp may take priority. In further embodiments, different signal resolution methods may be used.

The shelf availability assessment system 430 may also include components to calculate an accuracy assessment that may be used by the signal output 440 when it is deciding on an action to take. The accuracy assessment may describe how accurately an inventory of an item has been tracked compared to its true inventory. In an embodiment, the shelf availability assessment system 430 includes an accuracy assessor 444 to calculate the accuracy assessment. In an embodiment, the accuracy assessor 444 pulls ledgers and audit reports from a database of ledgers and audits 442. The database 442 may be in the shelf availability assessment system 430, or it may be an external database connected to the shelf availability assessment system 430 via a network. The ledgers include a tracked inventory for an item, and the audit reports include data about the true inventory of the item determined by a visual inspection by an employee. The accuracy assessment is calculated by comparing the tracked inventory to the true inventory. In an embodiment, the accuracy assessment is a percentage calculated by determining the difference between the tracked inventory and the true inventory, dividing the difference by the true inventory, and subtracting that value from 100%. For example, if the tracked inventory for an item is 10 and the true inventory determined by the audit is 8, the accuracy assessment would be 75%. In alternative embodiments, different methods of calculating the accuracy assessment may be used.

The signal output 440 may use the accuracy assessment with the overall unavailability score and/or received strong signal(s) in determining what action to take. By incorporating the accuracy assessment, the action performed by the signal output 440 may be different than if just the overall unavailability score or strong signal(s) is used. For example, when the accuracy assessment is not considered, the signal output 440 may update the tracked inventory if the overall unavailability score is sufficiently high. However, if the accuracy assessment is considered and is also sufficiently high, the signal output 440 may instead send a notification to employees to visually inspect the shelves. Because the accuracy assessment describes how accurate a tracked inventory has been historically, when the accuracy assessment is high, it is less likely that an item is unavailable when the tracked inventory says it is available, even if the overall unavailability score is high. Incorporation of an accuracy assessment into the decision by the signal output 440 may reduce the number of instances in which a tracked inventory is incorrectly set to zero.

Figure 5:
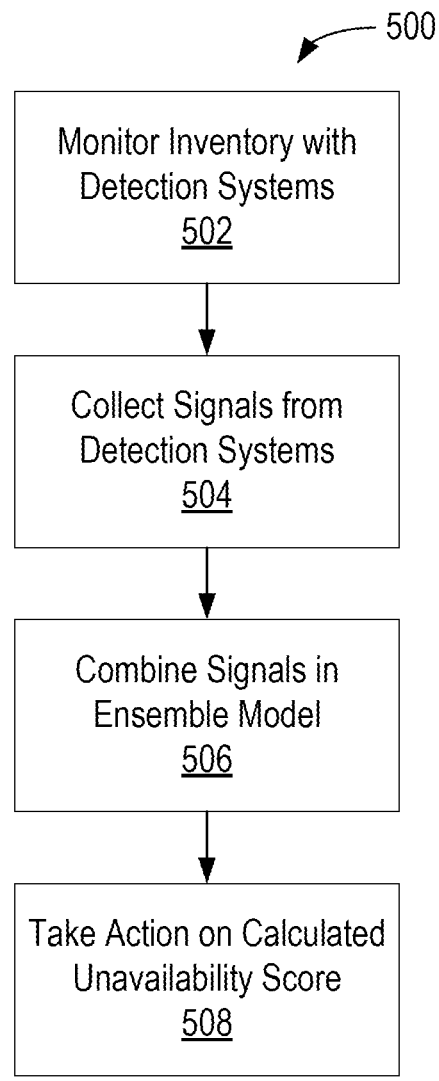
FIG. 5 illustrates a flowchart of a method of determining on-shelf availability.

Turning to FIG. 5, a flowchart of a method of determining on-shelf availability is shown. At a first step 502, a plurality of product availability detection systems monitors the availability of an item at a retail location. Examples of product availability detection systems are described above. When a detection system determines that the item may be unavailable, it generates a potential unavailability event signal.

At step 504, a shelf availability assessment system collects the potential unavailability event signals from the detection systems. At step 506, the potential unavailability events are input into an ensemble model in the shelf availability assessment system. The ensemble model combines the input potential unavailability events to generate an overall unavailability score for the item. The ensemble model may use, for example, a CAWPE method for calculating the overall unavailability score, weighting an accuracy score of each source detection system with an unavailability score associated with the potential unavailability event from that detection system in its calculation.

At step 508, the shelf availability assessment system takes an action based on the calculated overall unavailability score. As described above, examples of actions taken by the shelf availability assessment system include updating a tracked inventory for the item and sending a restocking assessment notification to employees. The shelf availability assessment system may also do nothing if the overall unavailability score is below a certain threshold.

Figure 6:
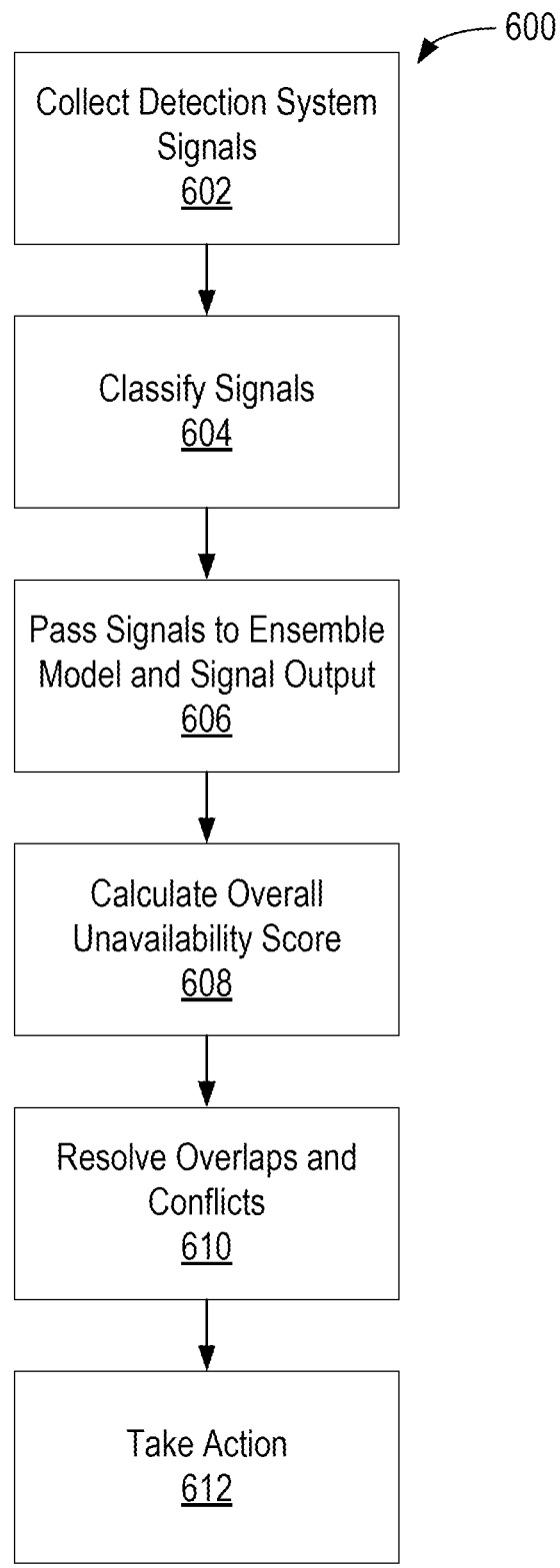
FIG. 6 illustrates a flowchart of a method of handling a plurality of signals in a shelf availability assessment system.

FIG. 6 illustrates a flowchart of a method of handling a plurality of signals in a shelf availability assessment system. At a first step 602, potential unavailability event signals from a plurality of product availability detection systems are collected at the shelf availability signal assessment system. This may be done by a signal collector in the shelf availability assessment system.

Next, at step 604, the potential unavailability events are classified as either a strong signal or a weak signal. As described above, this classification may be done based on which detection system was the source of the potential unavailability event. In alternative embodiments, the potential unavailability events may be classified on other criteria, such as a probability included in the potential unavailability event. At step 606, the potential unavailability events are passed to either an ensemble model or a signal output, both of which may be in the shelf availability assessment system. Signals that are classified as strong may be passed to the signal output, and signals that are classified as weak may be passed to the ensemble model. As described above, in some embodiments, signals are sent to either the ensemble model or the signal output, but not both; if all signals are classified as weak, all signals are sent to the ensemble model, but if any signals are classified as strong, then the strong signals are sent to the signal output and the weak signals are unused. At this step 606, the signals to be passed to the ensemble model may also be converted between binary, probabilistic, and discrete states to prepare the signals for use by the ensemble model.

At step 608, the ensemble model uses an ensemble method to combine the weak signals into an overall unavailability score. This calculation may be done using any of the methods described above, or any other ensemble methods. Once the overall unavailability score is calculated, it is sent to the signal output.

At step 610, the signal output resolves overlaps and conflicts between the strong signals it may have received and the overall unavailability score. As described above, this may be done by selecting the signal with the highest probability or accuracy. In alternative embodiments, the signal may be selected by which signal has a timestamp that is most recent.

At step 612, signal output takes an action based on the signal. As previously described, possible actions include updating a tracked inventory, sending a restocking assessment notification to an employee, or taking no action. As described above, the method depicted in FIG. 6 may be performed by a shelf availability assessment system in realtime, or it may be performed once each day.

Figure 7:
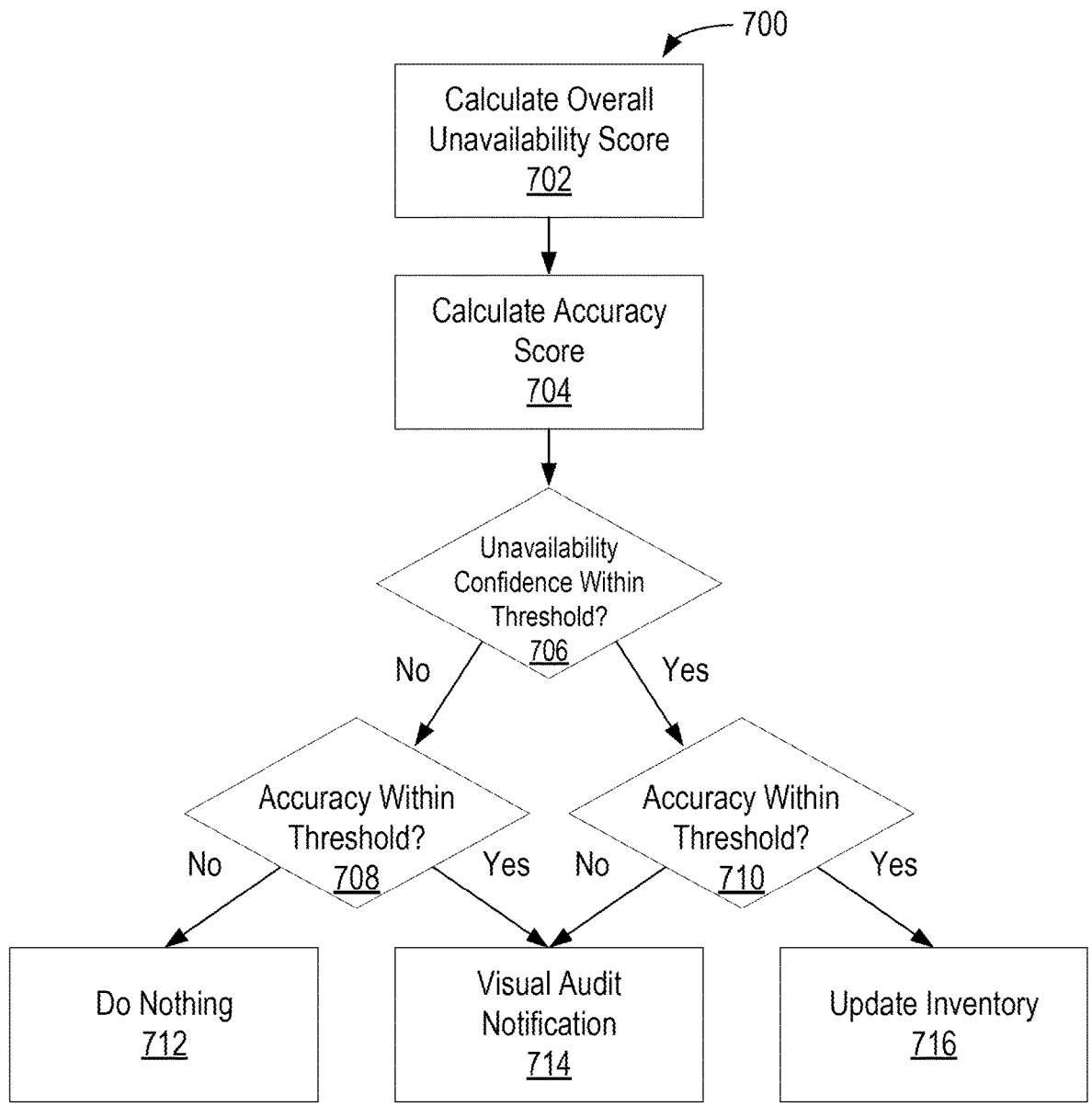
FIG. 7 illustrates a flowchart of a method of determining an action to take in response to a calculated overall unavailability score and an accuracy assessment.

Turning to FIG. 7, a flowchart of a method of determining an action to take in response to a calculated overall unavailability score and an accuracy assessment is shown. The method may be similarly performed with a strong signal instead of an overall unavailability score. At step 702, an overall unavailability score is calculated. This may be done using an ensemble model as described above. At a next step 704, an accuracy assessment is calculated. As described above, this may be done by comparing a tracked inventory from a ledger to a true inventory in an audit report that was determined by visual inspection. In an alternative embodiment, steps 702 and 704 may be performed in the opposite order, or they may be performed concurrently.

At step 706, the overall unavailability score is compared to a predetermined threshold. Such an unavailability score may, for example, correspond to a confidence in the unavailability of a given item, and may be set as a percentage or a normalized value, with higher values corresponding to higher confidence and lower values representing lower confidence of unavailability. If an unavailability score is within a predetermined threshold of a high confidence of unavailability (e.g., over 50% or 75%, for example, where represented as a percentage), the unavailability event may be scored as a likely unavailability event, and flow proceeds with step 710. If the unavailability score is below, or outside, of the predetermined threshold, flow may proceed with step 708. The accuracy assessment is then compared to a second threshold at either step 708 or 710, respectively depending on whether the overall unavailability score was within the first threshold. It may be determined, in such steps 708. 710, whether an accuracy score is within that second threshold (e.g., above a predetermined accuracy score or within a predetermined threshold range of "acceptable" accuracy). Finally, one of steps 712, 714, and 716 is performed depending on whether the overall unavailability score and the accuracy assessment were within a second respective thresholds. In particular, where the overall unavailability score is below an initial threshold (indicating low confidence in the unavailability event) and the accuracy assessment is also below its threshold (indicating lower confidence in accuracy of the signal), step 712 is performed and no action is taken. If the overall unavailability score is below or outside a threshold but the accuracy assessment is above, or within, a given threshold, then step 714 is performed and a notification is sent to an employee to perform a visual audit of the inventory of the item. Additionally, if the overall unavailability score is above or within a particular threshold, and the accuracy is below or outside of a second threshold, step 714 may also be performed. Finally, if the overall unavailability score is above or within its threshold (indicating high confidence in unavailability) and the accuracy assessment is above or within its threshold (indicating high signal accuracy), then step 716 is performed and a tracked inventory level for the item is updated, e.g., set to zero. The tracked inventory may be maintained on an inventory tracker. In an alternative embodiment, the accuracy assessment may be compared to its threshold before the overall availability score is compared to its threshold, or they may be compared to their respective thresholds simultaneously.

Figure 8:
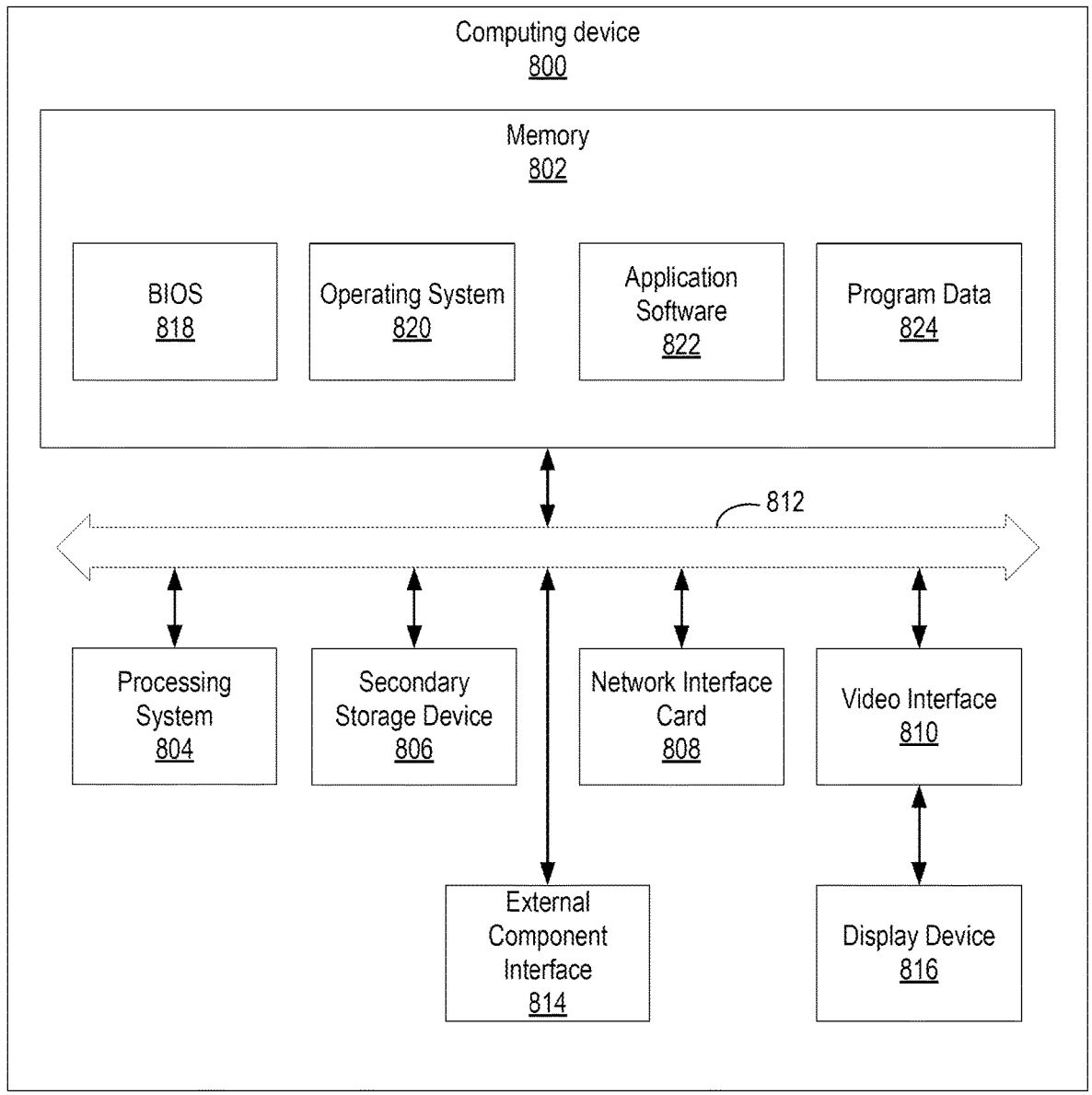
FIG. 8 illustrates an example computing device on which aspects of the present disclosure may be implemented.

FIG. 8 illustrates an example computing system 800 on which aspects of the present disclosure may be implemented. The computing device 800 can be used, for example, as the computing system 216 or the employee's mobile device 120, and it may be used to operate a shelf availability assessment system 430.

In the example of FIG. 8, the computing device 800 includes a memory 802, a processing system 804, a secondary storage device 806, a network interface card 808, a video interface 810, a display unit 816, an external component interface 814, and a communication medium 812. The memory 802 includes one or more computer storage media capable of storing data and/or instructions. In different embodiments, the memory 802 is implemented in different ways. For example, the memory 802 can be implemented using various types of computer storage media, and generally includes at least some tangible media. In some embodiments, the memory 802 is implemented using entirely non-transitory media.

The processing system 804 includes one or more processing units, or programmable circuits. A processing unit is a physical device or article of manufacture comprising one or more integrated circuits that selectively execute software instructions. In various embodiments, the processing system 804 is implemented in various ways. For example, the processing system 804 can be implemented as one or more physical or logical processing cores. In another example, the processing system 804 can include one or more separate microprocessors. In yet another example embodiment, the processing system 804 can include an application-specific integrated circuit (ASIC) that provides specific functionality. In yet another example, the processing system 804 provides specific functionality by using an ASIC and by executing computer-executable instructions.

The secondary storage device 806 includes one or more computer storage media. The secondary storage device 806 stores data and software instructions not directly accessible by the processing system 804. In other words, the processing system 804 performs an I/O operation to retrieve data and/or software instructions from the secondary storage device 806. In various embodiments, the secondary storage device 806 includes various types of computer storage media. For example, the secondary storage device 806 can include one or more magnetic disks, magnetic tape drives, optical discs, solid-state memory devices, and/or other types of tangible computer storage media.

The network interface card 808 enables the computing device 800 to send data to and receive data from a communication network. In different embodiments, the network interface card 808 is implemented in different ways. For example, the network interface card 808 can be implemented as an Ethernet interface, a fiber optic network interface, a wireless network interface (e.g., WiFi, WiMax, Bluetooth, etc.), or another type of network interface.

In optional embodiments where it is included in the computing device 800, the video interface 810 enables the computing device 800 to output video information to the display unit 816. The display unit 816 can be various types of devices for displaying video information, such as an LCD display panel, a plasma screen display panel, a touch-sensitive display panel, an LED or OLED screen, a cathode-ray tube display, or a projector. The video interface 810 can communicate with the display unit 816 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 814 enables the computing device 800 to communicate with external devices. For example, the external component interface 814 can be a USB interface and/or another type of interface that enables the computing device 800 to communicate with external devices or peripheral devices integrated within the same housing (e.g., in the case of mobile devices). In various embodiments, the external component interface 814 enables the computing device 800 to communicate with various external components, such as external storage devices, input devices, speakers, modems, media player docks, other computing devices, scanners, digital cameras, and fingerprint readers.

The communication medium 812 facilitates communication among the hardware components of the computing device 800. The communications medium 812 facilitates communication among the memory 802, the processing system 804, the secondary storage device 806, the network interface card 808, the video interface 810, and the external component interface 814. The communications medium 812 can be implemented in various ways. For example, the communication medium 812 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 802 stores various types of data and/or software instructions. The memory 802 stores a Basic Input/Output System (BIOS) 818 and an operating system 820. The BIOS 818 includes a set of computer-executable instructions that, when executed by the processing system 804, cause the computing device 800 to boot up. The operating system 820 includes a set of computer-executable instructions that, when executed by the processing system 804, cause the computing device 800 to provide an operating system that coordinates the activities and sharing of resources of the computing device 800. Furthermore, the memory 802 stores application software 822. The application software 822 includes computer-executable instructions, that when executed by the processing system 804, cause the computing device 800 to provide one or more applications. The memory 802 also stores program data 824. The program data 824 is data used by programs that execute on the computing device 800.

Although particular features are discussed herein as included within an electronic computing device 800, it is recognized that in certain embodiments not all such components or features may be included within a computing device executing according to the methods and systems of the present disclosure. Furthermore, different types of hardware and/or software systems could be incorporated into such an electronic computing device.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of determining an on-shelf availability status of an item within a retail location, the method comprising:
monitoring product availability of a collection of items offered for sale at the retail location using a plurality of different product availability detection systems, each of the plurality of different product availability detection systems being configured to generate a potential unavailability event in response to detection of product unavailability of at least one item of the collection of items;
receiving a collection of potential unavailability events from the plurality of different product availability detection systems, the collection of potential unavailability events each being associated with an item from the collection of items;
classifying each of the potential unavailability events as a strong signal or a weak signal based, at least in part, on the product availability detection system from which the potential unavailability event is received; and
for each item associated with at least one of the collection of potential unavailability events:
based on a determination that each of the potential unavailability events associated with the item is classified as a weak signal, determining, at an ensemble model, an overall unavailability score for the item; and
based on a determination that either (1) at least one of the potential unavailability events associated with the item is classified as a strong signal or (2) the overall unavailability score exceeds a predetermined threshold, generating a restocking assessment notification.

2. The method of claim 1, wherein determining the overall unavailability score of the item includes:
determining an unavailability score associated with each potential unavailability event associated with the item and an accuracy score associated with each product availability detection system from which each potential unavailability event was received; and
calculating the overall unavailability score for the item as a weighted, normalized aggregate based on the unavailability score associated with each potential unavailability event and the accuracy score associated with each product availability detection system.

3. The method of claim 2, wherein determining the unavailability score associated with each potential unavailability event associated with the item includes:
for each potential unavailability event:
determining whether the potential unavailability event is in a binary state, a probabilistic state, or a discrete state; and
upon determining that the potential unavailability event is in a binary state or a discrete state, converting the potential unavailability event to a probabilistic state.

4. The method of claim 2, wherein a weight used to calculate the weighted, normalized aggregate is updated in response to a determination that the overall unavailability score for an item indicates that the item is unavailable and a visual audit indicates that the item is available.

5. The method of claim 1, wherein classifying the potential unavailability event as a weak signal is based on a historical accuracy of potential unavailability event signals received from the associated product availability detection system being below a predetermined threshold accuracy.

6. The method of claim 1, wherein the overall unavailability score is determined using a plurality of potential unavailability events classified as weak signals.

7. The method of claim 1, wherein the restocking assessment notification is transmitted to a mobile device of an employee at the retail location.

8. The method of claim 1, wherein the plurality of product availability detection systems collectively detect product availability for each of the items offered for sale at the retail location.

9. The method of claim 1, wherein one or more of the different product availability detection systems detect product availability for fewer than all of the items from among the collection of items offered for sale at the retail location.

10. The method of claim 1, further comprising:
updating a tracked inventory for an item in response to the overall unavailability score for the item being above a second predetermined threshold, the second predetermined threshold being higher than the predetermined threshold used to determine whether to generate the restocking assessment notification.

11. An inventory management system for a retail location, the inventory management system comprising:
a plurality of product availability detection systems, each product availability detection systems configured to output a potential unavailability event in response to detection of product availability of at least one item in a plurality of items, the potential unavailability event including a probability of unavailability for at least one item in the plurality of items for sale and an accuracy of the product availability detection system determined from a training accuracy of the product availability detection system; and
a shelf availability assessment system including an ensemble model, the shelf availability assessment system executing on a computing system and being configured to:
receive a collection of potential unavailability events from the plurality of different product availability detection systems, the collection of potential unavailability events each being associated with an item from the plurality of items;
classify each of the potential unavailability events as a strong signal or a weak signal based, at least in part, on the product availability detection system from which the potential unavailability event is received; and
for each item associated with at least one of the collection of potential unavailability events:
based on a determination that each of the potential unavailability events associated with the item is classified as a weak signal, determine, at the ensemble model, an overall unavailability score for the item; and
based on a determination that either (1) at least one of the potential unavailability events associated with the item is classified as a strong signal or (2) the overall unavailability score exceeds a predetermined threshold, generate a restocking assessment notification.

12. The inventory management system of claim 11, wherein the accuracy of the product availability detection system is specific to the at least one item in the plurality of items for sale.

13. The inventory management system of claim 12, wherein the restocking assessment notification is transmitted to a dashboard graphical user interface.

14. The inventory management system of claim 11, further comprising an accuracy assessor, the accuracy assessor configured to generate an accuracy assessment for the item, the accuracy assessment calculated, at least in part, by comparing a tracked inventory for the item to a true inventory for the item.

15. The inventory management system of claim 14, further comprising an inventory tracker configured to track an inventory for each item in the plurality of items for sale,
wherein, in response to the overall unavailability score for an item being above the predetermined threshold and the accuracy assessment for the item being above a second predetermined threshold, the inventory counter updates the tracked inventory for the item to be zero.

16. The inventory management system of claim 11, wherein to determine the overall unavailability score for the item includes to:
determine an unavailability score associated with each potential unavailability event associated with the item and an accuracy score associated with each product availability detection system from which each potential unavailability event was received; and
calculate the overall unavailability score for the item as a weighted, normalized aggregate based on the unavailability score associated with each potential unavailability event and the accuracy score associated with each product availability detection system.

17. A shelf availability assessment system for use at a retail location, the system comprising:
a signal collector, the signal collector configured to:
receive, from a plurality of product availability detection systems, a collection of potential unavailability events, the collection of potential unavailability events each being associated with an item from a collection of items for sale at the retail location, and
convert potential unavailability events to a probabilistic state;
an ensemble model, the ensemble model configured to:
receive a plurality of potential unavailability events from the signal collector, and
calculate an overall unavailability score by processing the plurality of potential unavailability events in an ensemble method, the overall unavailability score based, at least in part, on probabilities associated with the plurality of potential unavailability events; and
a signal output, the signal output configured to:
receive the overall unavailability score from the ensemble model, and
generate an unavailability response, the unavailability response based, at least in part, on the overall unavailability score.

18. The shelf availability assessment system of claim 17, further comprising an accuracy assessor configured to generate an accuracy assessment for the item, the accuracy assessment calculated, at least in part, by comparing a tracked inventory for the item to a true inventory for the item.

19. The shelf availability assessment system of claim 18, wherein the unavailability response is further based, at least in part, on the accuracy assessment.

20. The shelf availability assessment system of claim 19, wherein, based on the overall unavailability score being within a first predetermined threshold and the accuracy assessment being within a second predetermined threshold, the unavailability response corresponds to a restocking assessment notification.

* * * * *